(No Model.)

A. HANDLEY.
COMBINED FEED HOPPER AND WATER TROUGH.

No. 331,132. Patented Nov. 24, 1885.

WITNESSES
T. Walter Fowler
H. B. Applewhaite

INVENTOR
Abram Handley
Per A. H. Evans & Co.
Attorneys

UNITED STATES PATENT OFFICE.

ABRAM HANDLEY, OF ACTON, MASSACHUSETTS.

COMBINED FEED-HOPPER AND WATER-TROUGH.

SPECIFICATION forming part of Letters Patent No. 331,132, dated November 24, 1885.

Application filed June 20, 1885. Serial No. 169,290. (No model.)

*To all whom it may concern:*

Be it known that I, ABRAM HANDLEY, a citizen of the United States residing at Acton, in the county of Middlesex and State of Massachusetts, have invented certain new and useful Improvements in a Combined Feed-Hopper and Water-Trough, of which the following is a full, clear, and exact description, reference being had to the accompanying drawings, forming part of this specification, in which—

Figure 1:
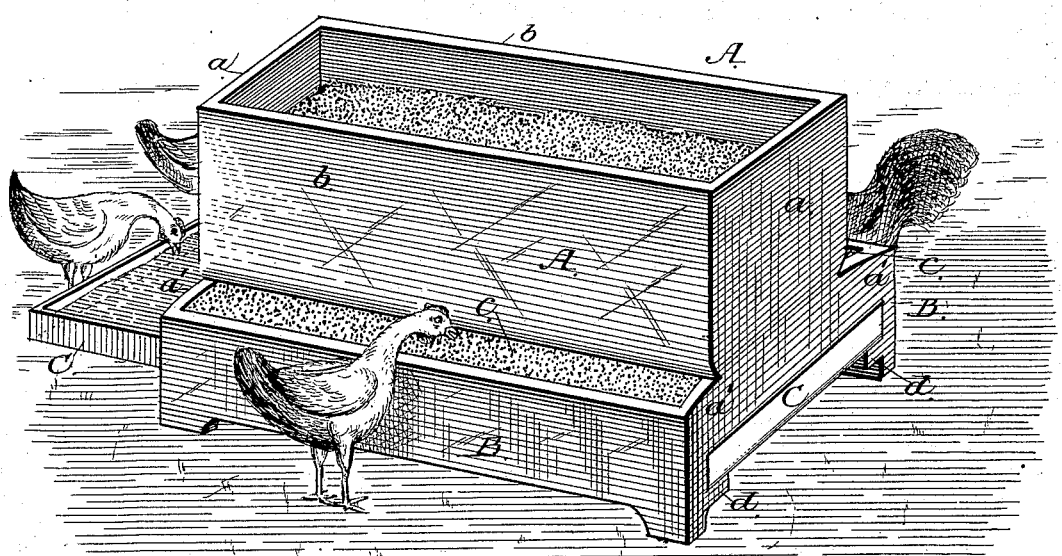
Figure 2:
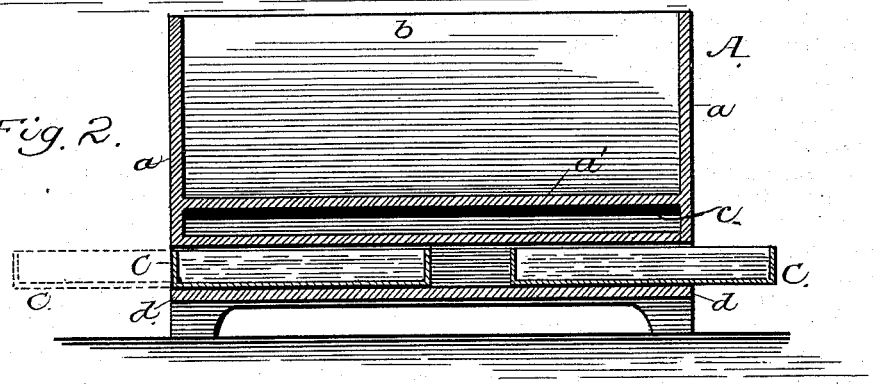

Figure 1 represents a perspective view of my improved feed-hopper and water-trough. Fig. 2 is a longitudinal sectional view of the same.

My invention relates to feed-hoppers and water-troughs, preferably adapted to poultry; and the same consists in combining with a feed-hopper suitable water-troughs which form a part of the feed-hopper, and arranged so that the water-troughs may be detached from the feed-hopper for the purpose of cleaning the same.

The object of my device is to provide means whereby the fowls may have easy access to both water and feed. This object is attained by the use of the device illustrated in the drawings, in which—

A represents a feed-hopper composed of either wood or metal and having the end pieces, $a$, the bottom $a'$, and sides $b$, as shown. The end pieces are extended toward the sides at $a'$, thereby leaving an opening, $c$, on each side, and in the openings thus formed the grain is automatically fed from the main portion of the feed-hopper. These openings $c$ are closed at the sides by the strips B, which prevent the grain from falling to the ground but leave the top open so that the fowls may have free access to the contents of the rack. Located directly beneath the feed-hopper are one or more water-troughs, C, which are mounted upon and have a sliding adjustment upon suitable cleats, $d$, formed on the inside of the strips B, as shown in Fig. 1.

In the present case I show a device approximately rectangular in shape, and show a trough upon each end of the same, the said troughs moving in opposite directions, thereby enabling a large number of fowls to drink from the troughs without unnecessary crowding. However I do not limit myself to this exact construction, as the same result may be accomplished by using other forms of hoppers and troughs.

From the foregoing description it is evident the water-troughs may be readily detached from the feed-hopper and the same cleaned when necessary; also, if it be desired the water-troughs C may have a slight inclination toward each end, so as to enable the fowls to drink from the troughs as long as any water remains.

I am aware a hay-rack has been constructed with sliding drawers placed under the slats which form the bottom of the rack, for the purpose of catching the grass-seed as it is liberated from the hay in feeding, and such construction I do not broadly claim as my invention.

Having thus described my invention, what I claim as new, and desire to secure by Letters Patent, is—

A feeding device comprising the hopper A, having bottom $a'$, side troughs communicating with said hopper, and sliding water-receptacles mounted upon cleats beneath the bottom of the hopper, substantially as described.

ABRAM HANDLEY.

Witnesses:
E. A. BATCHELDER,
WILLIAM S. HANDLEY.